UNITED STATES PATENT OFFICE.

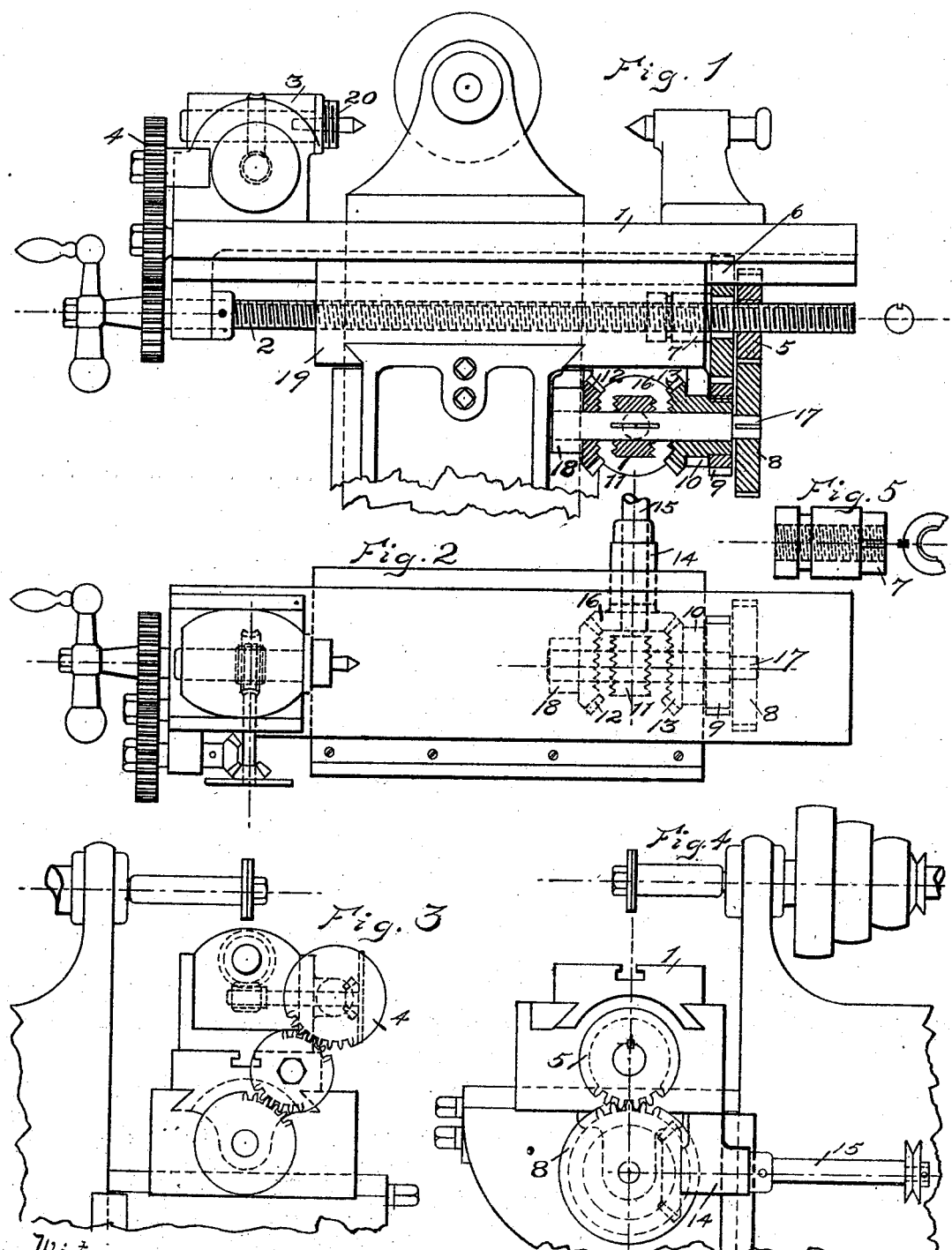

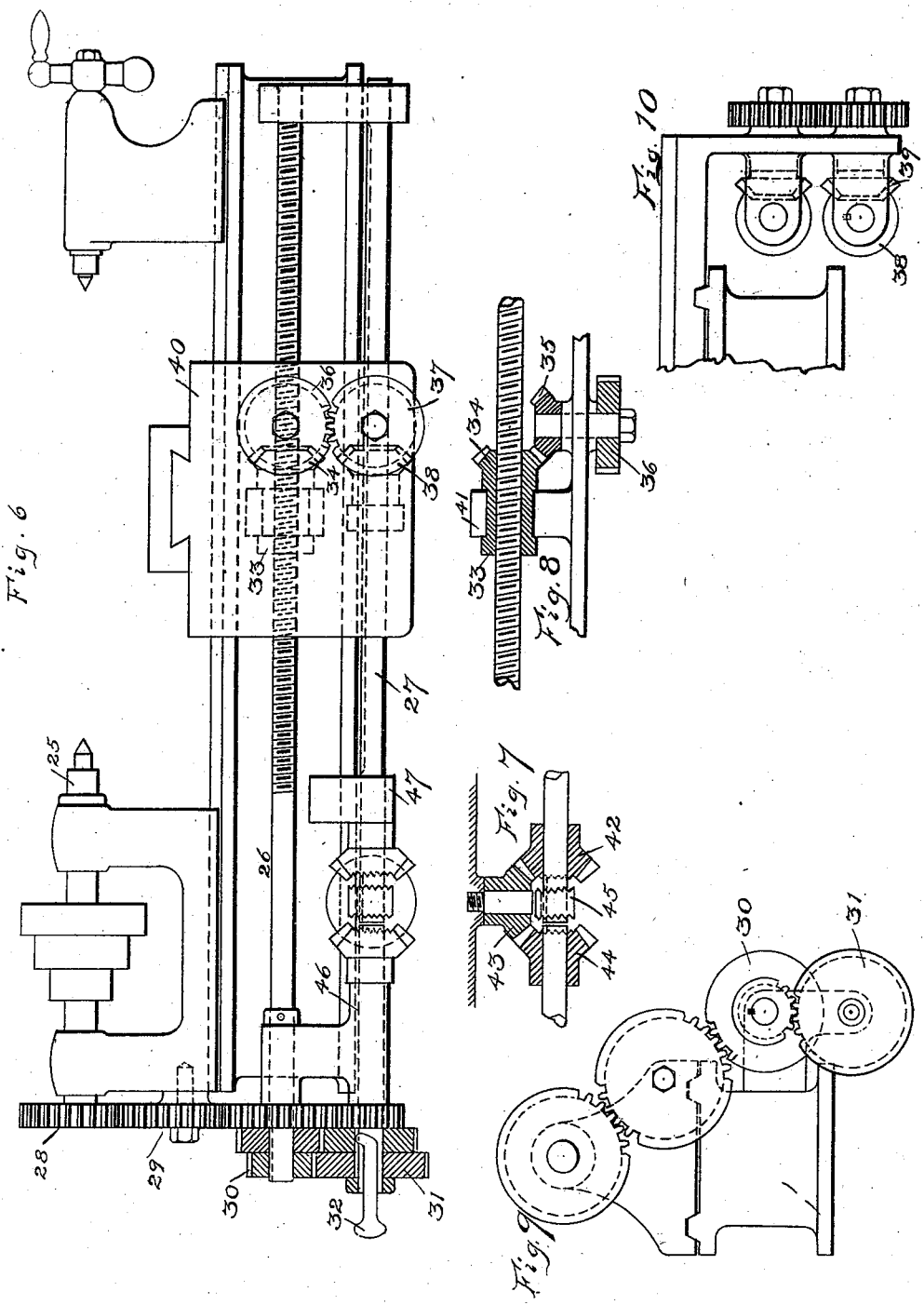

EDWARD JOSEPH McCLELLAN, OF NEW YORK, N. Y.

FEED-MOTION.

SPECIFICATION forming part of Letters Patent No. 502,131, dated July 25, 1893.

Application filed August 15, 1892. Serial No. 443,176. (No model.)

*To all whom it may concern:*

Be it known that I, EDWARD JOSEPH MC-CLELLAN, a citizen of the United States, residing in New York, in the county of New York, State of New York, have invented an Improvement in Feed-Motions as Applied More Particularly to Machine-Tools, of which the following is a specification, reference being had to the accompanying drawings.

The idea of the invention is a screw feed in which the screw and nut are both driven and at differential speeds by means of change gearings and thus give various rates of feed.

Figure 1 is a side view of the mechanism as applied to the slide of a universal milling machine. Fig. 6 is a side view of the mechanism as applied to an engine lathe. Fig. 3 is an end view from the dividing head end; Fig. 4 an end view from the back end, and Fig. 2 is a plan view of the gearing. Fig. 5 is a detail of the rotary nut 7. Fig. 9 is an end view of the lathe; Fig. 7 a plan view of the bevels and clutch which connects the two ends of the shaft 27. Fig. 10 is an end view of the carriage, and Fig. 8 is a plan view of rotary nut and connecting gearing on feed screw 26.

Referring to Fig. 1, the slide 1 moves in the saddle 19 and is fed by the screw 2. This screw 2 passes through the nut 7 and the screw is driven by gear 5 which has a plain hole and turns the screw by means of a key. The nut 7 is round and free to turn but prevented from moving endwise and has a gear 6 fastened on its outer end. These gears 5 and 6 are driven by gears 8 and 9 which are in turn connected to shaft 15, to which power is applied, by means of bevels 12, 13, 16 and clutch 11 working between. To the end of shaft 15 is fastened bevel gear 16 which drives bevels 12 and 13, which are loose on shaft 17 and drive 17 by means of clutch 11. The shaft 17 is supported in bearings 18 and 10, and as will be seen in the section view Fig. 1, the hub of the bevel 13 passes through the bearing 10 and carries the gear 9 directly on it. The gear 8 is fast on shaft 17 and therefore has its motion reversed according to which bevel the clutch 11 connects with. As shown, the gear 9 does not reverse. The end of the screw 2 is connected to the dividing head 3 and drives the rotating spindle 20 carried therein, by means of the train of gears 4, with which and the details of the dividing head we are not concerned. The power feed is stopped by throwing out the power connection to shaft 15. The nut 7 may be locked to prevent it from turning, when desirable.

The action is as follows:—Supposing the clutch 11 in mesh with bevel gear 13, the gears 8 and 9 will turn in the same direction and drive screw 2 and nut 7 at speeds depending on the relative ratios of the respective gearing. If the nut 7 did not rotate, the slide 1 would advance at a rate due to the pitch of the screw, say one-third of an inch per revolution of screw. If now the nut rotates in the same direction as the screw but say at half the speed, the slide 1 will advance at the rate of half the pitch of the screw or say one-sixth of an inch per revolution of screw. By changing the gearing 8, 9, 5, 6 we can get any required ratio between the speeds of the screw and nut and thus in effect vary the pitch of the feed screw. If we make the screw and nut rotate in opposite directions, as we can do by throwing the clutch 11 into mesh with bevel gear 12, the effect is similar to an increase in the coarseness of the pitch of the feed screw or the reverse of the effect first mentioned. The screw 2 being connected to the dividing head spindle 20, the spindle 20 and work held in it are being rotated at the same time that they are being carried along by table 1. If we have a cutter acting on the work it will mill a spiral, the pitch of this spiral depending on the rate of rotation of spindle 20 per inch of advance of table. By making the nut 7 and screw 2 revolve at nearly the same rate and in the same direction, the screw 2 and consequently the spindle 20, will make a great many revolutions for a small advance of the slide 1 and hence fine pitch spirals can be cut, which is impossible with the ordinary machines in which changes between the speed of spindle 20 and rate of advance of table are all made by the gearing 4. If we make the nut rotate at the same rate as the screw and in the same direction, the screw 2 and spindle 20 will revolve but the slide 1 will not advance at all and hence we can mill a circular groove instead of a spiral. This method is also theoretically more perfect since the slide advances in proportion to the pitch being cut, going slower for fine pitches where there is a greater length of actual cut, instead of advancing regardless of the pitch being cut.

For practical reasons it may be best to make the changes in gearing, on gears not placed directly on the screw and nut but connected thereto by intermediate gears. It is also evident that with some ratios of gearing the slide will feed backward. With this system we can use the change gears provided for cutting spirals to obtain a range of feeds for plain work in addition to those given by the ordinary feed belt cones, or for plain work only, we may use cone pulleys to give the relative changes of speed to screw and nut. In the case of the lathe, the spindle 25 connects to lead screw 26 and feed shaft 27 by means of gears 28, 29 which connect to change gears 30 which are all fast on screw 26. These gears 30 gear with gears 31 which are loose on shaft 27 and which drive the shaft through a sliding key in the usual way. The shaft 27 is broken just outside the bevel 44 as shown and the longer end of the shaft is driven by clutch 45 through bevels 44, 43, 42 which provide for reversing the rotation of the shaft.

Splined on shaft 27 is the bevel gear 38, carried along by the carriage 40, which drives bevel 39 which is connected by short shaft with gear 37 which drives gear 36 which in turn drives the rotary nut 33 through a short shaft and bevels 35—34. The bevel 34 is solid on the nut 33 and the nut is carried in bearing 41 on the carriage 40 and prevented from moving endwise in its bearing. These gears 36, 37 can be changed to give different ratios of speed.

The action is as follows: When the spindle is revolved, the lead screw 26 is revolved at a certain speed and the nut in the carriage is rotated at a speed determined by the change gears 31 and 36, 37, and the direction of the nut's rotation is determined by the clutch 45 and bevels 44, 43, 42. With the three change gears 31 and the change gears 36, 37 on apron of carriage together with the bevels 44, 43, 42 for reversing nut, twelve changes of pitch can be made. To save the feed shaft 27 we might spline the lead screw 26 to drive a gear and gear back from this to the rotary nut in the same manner that we do now with the feed shaft. With this plan we can cut a greater range of pitches than is possible with an ordinary lathe. By setting the change gears for a very fine pitch we get a feed for turning. The carriage is moved quickly by hand by rotating the nut by hand; disconnecting the power gearing from both screw and nut. Instead of using regular change gears we may of course use other varieties of change gearing, such as chain and sprocket wheels, friction disks, and cone pulleys, though in the last two cases the pitch of the feed would not be accurate.

To cut right and left hand threads we must make provision for reversing the rotation of screw 26 which we can do in the gearing 28, 29 and in the case of the milling machine Fig. 1 we can change the hand of the spirals cut, by changes in gearing 4 and we can make the slide 1 feed either way with the same pitch by reversing the rotation of driving shaft 15.

What I claim is—

1. The combination in a universal milling machine and in a lathe, of a rotating feed screw and a rotating nut thereon, to feed the slide in said machine, change gearing for varying the relative rotative speeds of said screw and nut, said screw and nut being geared to the rotating spindle holding the work, for the purposes and substantially as described.

2. The combination in a universal milling machine and in a lathe, of a rotating feed screw and a rotating nut thereon, to feed the slide in said machine, change gearing for varying the relative rotative speeds of said screw and nut, and relative reversing gear for said screw and nut, said screw and nut, being geared to the rotating spindle holding the work, for the purposes and substantially as described.

EDWARD JOSEPH McCLELLAN.

Witnesses:
C. H. McCLELLAN,
M. E. BARNETT.